UNITED STATES PATENT OFFICE.

EMILE AUGUSTE LEOPOLDE ROUXEVILLE, OF PARIS, FRANCE.

TREATMENT OF HYDROCARBONS.

No. 919,248.  Specification of Letters Patent.  Patented April 20, 1909.

Application filed June 11, 1906. Serial No. 321,297.

*To all whom it may concern:*

Be it known that I, EMILE AUGUSTE LEOPOLDE ROUXEVILLE, a citizen of the French Republic, and resident of 41 Rue du Paradis, Paris, France, have invented certain new and useful Improvements in the Treatment of Hydrocarbons, with a view of obtaining an artificial product possessing most of the properties of india-rubber and, besides, the property of regenerating old india-rubber, of which the following is a specification.

This invention relates to a process by means of which a great number of hydrocarbons may be changed in their composition so that an artificial product is formed, which is distinguished by a new composition, and new properties. This product is not soluble or less soluble in liquids, which dissolved the original hydrocarbons. The hydrocarbons which originally were liquid or viscous become more viscous or pasty and even solid; they no longer evaporate at ordinary temperature and are not acted upon by the substances which formerly did act upon them; the hydrocarbons which belong to the same class as the terpenes become plastic, have a tendency to become elastic and combine directly or indirectly with sulfur, are adapted to mix intimately with other artificial products or natural india rubber or become adapted to serve as dissolving medium or regenerator for natural vulcanized india rubber and further they have insulating properties.

The products obtained according to the process, which forms the object of the present invention, may also be utilized for the manufacture of varnish, bird-lime, glue, coating and for similar purposes if, for example the hydrocarbons are subjected only to a part of the process in question.

The product obtained by the entire process has great similarity with natural india rubber and gutta-percha.

The process comprises three successive operations which according to the product to be obtained are either applied in totality or partially, each operation allowing modifications as for example the use of different chemical agents, aiming at the same effect. The operations composing the process are the following:—

1. Transformation proper, which may be considered an oxidation or a polymerization and which is effected by submitting the hydrocarbon once or several times to the action of an oxidizing agent. This operation may be effected by heating or by cooling in one operation or in several operations, by using the same oxidizing agent each time or by using different oxidizing agents.

2. Separation and purification of the new product. The same consists in eliminating foreign bodies and the excess of the oxidizing agent. This operation may be carried out to a more or less high degree of perfection either by washing with warm water and consequent decantation or by neutralization and consequent washing or by dissolving the new product in a suitable solvent, or by distilling the product under ordinary pressure or *in vacuo* after having washed the same or finally by other chemical means.

3. Coagulation and vulcanization of the new product. These two operations are not indispensable. The same may be effected by the old means used for this purpose particularly with the aid of sulfur or of compounds of sulfur. These operations may be carried out immediately after the oxidizing operation. If liquid chlorid of sulfur is used for this purpose it must be borne in mind that the presence of sulfur in the new product obtained may be useful or noxious according to the object aimed at.

When solid hydrocarbons such as resin or gums are to undergo the above transformation they are first powdered up and dissolved in spirit of turpentine or analogous hydrocarbons.

To better explain the process of transformation I shall hereinafter describe the application of the process to a well known mixture of hydrocarbons, for example, spirit of turpentine with the use of a distinct oxidizing agent viz,. sulfuric acid. It will be understood that by varying the proportions of the two materials and according to whether the mixing is done under cooling or without cooling slightly different products will be obtained. If operated under cooling, 100 grams of spirit of turpentine are mixed with 80 grams of sulfuric acid of 65° Baumé. If one operates without cooling much less acid is to be used but the reaction will be more violent and difficult to effect without the formation of carbon, although it is possible when the operation is carried out slowly. The mixing of the two substances is effected in a very large vessel, which is externally cooled by flowing water or even with ice; if in the latter instance the oxidation should not be sufficient it may be completed by slightly heating the combined materials. The mixture is then left to cool for about 12 to 15 hours whereupon three quite distinct layers will have formed; the top-layer which is black and viscous, the intermediate part which is red and liquid and the bottom part which is black. When the operation has been well carried out and when the acid has been poured in very slowly and under continuous stirring the bottom part will be not very important. The three layers are separated by decantation. The intermediate part, containing much acid and comparatively little hydrocarbon can be thrown away if one should not want to submit it to a separate treatment. The bottom part will be collected with a view to future utilization, as it contains useful viscous matter. The upper layer is then brought into an evaporator and heated with three or four times its volume of water to 80–100° C. under continuous stirring, whereupon it is allowed to settle until the product collects on the surface when it is separated by decantation. At this moment the material may be submitted to distillation under ordinary pressure or *in vacuo* but this operation is not absolutely necessary. There could further be carried out at this moment the coagulation, which will be described subsequently. The product is then boiled in 4 to 5 times its volume of water to which an alkali is added, sodium hydrate or carbonate of sodium, the latter in preference; the alkali is added in sufficient quantity to effect neutralization. To separate off the sodium salts the product is precipitated by any known chemical means for example by adding alum to the emulsion of the product in water, whereupon the solution is agitated and left to cool and settle. The product is then separated by decantation whereupon the product is washed repeatedly first in slightly acidulated warm water and then in pure warm water. The product may be utilized in this state already but it may be further oxidized which also could have been done after the separation of the upper layer for which purpose it will be again treated either with sulfuric acid or with nitric acid, or with chlorid of sulfur. It must however be taken into consideration, that (1) the use of azotic acid gives a somewhat different product which is soluble in water and that (2) the action of the chlorid of sulfur not only effects an oxidation, but even a semi-vulcanization, which is advantageous for some products and disadvantageous for others because the product will contain sulfur which is difficult to eliminate.

The refining can be obtained by dissolving the product in carbon bisulfid and in agitating the solution with very much water, which has to be renewed several times. The carbon bisulfid solution is separated from the water and the product may if necessary be precipitated with alcohol, or the carbon bisulfid is eliminated by evaporation or distillation. The product is now ready for use and may be mixed with other substances particularly with india-rubber and it may further serve as agglomerate for the artificial substitutes used in the india rubber industry. Its principal use however consists in using it to regenerate vulcanized india rubber as will be explained farther on.

A quick coagulation of the product may be obtained by adding to the new product obtained about 10 per cent. of its weight of carbon bisulfid, to make it more liquid if necessary. Hereupon about 10 per cent. of its weight of liquid chlorid of sulfur is added. After reaction, the solution is left to cool and settle; whereupon it is washed with boiling water, and, if required, part of the sulfur is eliminated by boiling the product in a concentrated solution of sodium hydrate, whereby sulfid of sodium is produced, which may easily be eliminated by successive washing with hot water. The chlorin may be removed with lime or in any other manner.

The vulcanization is effected in the usual manner.

By judiciously varying the several operations and the proportions of the admixtures as well as the degree of coagulation, artificial products may be obtained which are of compositions resembling those of the various natural india rubbers.

As already mentioned the product obtained by the hereinbefore described operations, may be used for regenerating vulcanized india rubbers. India rubber when vulcanized loses certain qualities principally that of being soldered with itself; the rubber having been solidified partly by the vulcanization, is no longer viscous. To devulcanize this india rubber the sulfur must either be removed or that part be added which had imparted the viscosity to the india rubber. The artificial product obtained by means of the present process possesses the following two particular properties: It has much affinity for sulfur and further constitutes a perfect solvent for india rubber when it has been liquefied by heat. For these two reasons it is adapted to regenerate waste india rubber, because if mixed in suitable proportion with natural vulcanized india rubber and treated in a vulcanizing apparatus, after heating anew, a perfectly homogeneous product will be obtained, as an exchange of sulfur has taken place between the vulcanized india rubber and the artificial product. The natural india rubber may be separated from the artificial product either by dissolving the artificial product in a solvent for instance acetone in which natural india rubber is insoluble or by treating the mixture with an alkali as the artificial product combines with the alkali and afterward forms an emulsion in water.

As already mentioned the treatment as well as the proportions of the chemicals used for the several operations may be varied at will and the novel product may be used for other purposes than those hereinbefore indicated without departing from the principle of the present invention.

What I claim as my invention and desire to secure by Letters Patent, is:—

1. The herein described process of treating hydrocarbons which consists in subjecting the latter to the action of sulfuric acid, cooling the mixture, separating the upper portion, heating the same with water, separating by decantation, boiling the product in an alkaline bath for neutralization, precipitating by means of alum, and refining the resultant product by subjecting it to carbon-bisulfid and eliminating the latter.

2. The herein described process of treating hydrocarbons which consists in subjecting the latter to the action of sulfuric acid, cooling the mixture, separating the upper portion, heating the same with water, separating by decantation, boiling the product in sodium hydrate solution for neutralization, precipitating by means of alum, and refining the resultant product by subjecting it to carbon-bisulfid and eliminating the latter.

3. The herein described process of treating hydrocarbons which consists in submitting the latter to the action of an oxidizing agent, cooling the mixture, separating the upper portion, heating the same with water, separating by decantation, boiling the product in sodium hydrate solution for neutralization, precipitating by means of alum, and refining the resultant product by subjecting it to carbon-bisulfid and eliminating the latter.

In witness whereof I have hereunto set my hand in presence of two witnesses.

EMILE AUGUSTE LEOPOLDE ROUXEVILLE.

Witnesses:
LUDWIG SARANDY,
HANSON C. COXE.